United States Patent
Auvray

[11] Patent Number: 5,442,095
[45] Date of Patent: Aug. 15, 1995

[54] CATALYSTS, PROCESS FOR THEIR PREPARATION, AND THEIR USE

[75] Inventor: Patrick Auvray, L'Hay les Roses, France

[73] Assignee: Rhone-Poulenc Nutrition Animale, Commentry, France

[21] Appl. No.: 46,178

[22] Filed: Apr. 14, 1993

Related U.S. Application Data

[63] Continuation of Ser. No. 751,814, Aug. 30, 1991, abandoned.

[30] Foreign Application Priority Data

Sep. 5, 1990 [FR] France ................. 90 11006

[51] Int. Cl.⁶ .............................................. C07C 69/66
[52] U.S. Cl. ................................... 560/170; 558/61; 558/462; 564/204; 568/349; 568/459; 568/947
[58] Field of Search ................. 560/174; 558/61, 462; 564/204; 568/349, 459; 947

[56] References Cited

U.S. PATENT DOCUMENTS

Re. 31,812  1/1985  Kunz et al. ................. 568/454
4,460,786  7/1984  Morel ........................ 560/126

FOREIGN PATENT DOCUMENTS 2366237   4/1978  France .
2486525   1/1982  France .
47-40775 10/1972  Japan .

OTHER PUBLICATIONS

Ayres et al., J. Inorg. Nucl. Chem., vol. 3, 1957, p. 365.
Jorgensen, Acta. Chem. Scand., No. 10, 1956, p. 500.
Annales de Chimie, 1961, p. 1383.

*Primary Examiner*—Paul J. Killos
*Attorney, Agent, or Firm*—Finnegan, Henderson, Farabow, Garrett & Dunner

[57] ABSTRACT

Catalysts based on rhodium and water-soluble phosphine obtained by using rhodium perchlorate as the precursor rhodim salt. Also, processes for the preparation of these catalysts and to their use are provided.

5 Claims, No Drawings

CATALYSTS, PROCESS FOR THEIR PREPARATION, AND THEIR USE

This is a continuation of application Ser. No. 07/751,814, filed Aug. 30, 1991, now abandoned.

The invention relates to catalysts based on rhodium and phosphine which can be used in industrial processes. The invention also relates to processes for the preparation of these catalysts and to their use. More particularly, these catalysts are useful in reactions for the hydrogenation of dienes or for the addition of compounds containing active methylene groups to dienes.

Several types of catalysts based on rhodium and phosphine are known. French Patent 7,622,824, published under number 2,366,237, relates to the use of catalysts consisting of a water-soluble phosphine and a transition metal, in metallic form or in the form of a salt, chosen from palladium, nickel, platinum, cobalt and rhodium, the preferred metal being palladium.

French Patent 8,015,355, published under number 2,486,525, relates to the use of a catalyst consisting of a water-soluble phosphine and rhodium to catalyze the addition of a compound containing an active methylene group to a conjugated diene. According to this French '355 patent, the catalyst is obtained from a precursor salt, which may be $RhCl_3$, $RhBr_3$, $Rh_2O$, $Rh_2O_3$, $Rh(NO_3)_3$, $Rh(CH_3COO)_3$, $Rh(CH_3COCHCOCH_3)_3$, $[RhCl(cycloocta-1,5-diene)]_2$, $[RhCl(CO)_2]_2$ or $RhCl_3(C_2H_5NH_2)_3$; More particularly, the salts used are $RhCl_3$ and $[RhCl(cycloocta-1,5-diene)]_2$.

Although these types of known catalysts have proven useful, it has not been apparent that any of these catalysts could overcome the disadvantages inherent in these catalysts. In particular, some problems result from the nature of the precursor rhodium salt used. For example, first, when the salts described in the above-mentioned two French patents are used, only 80 to 90% of the rhodium present is in an easily complexible form and is therefore converted to the catalytic species. Second, some secondary oxidation reactions of phosphines have been observed, which further reduce the yield from this reaction. Third, these precursor salts may not always be obtained in solid form. This may be reflected during the formation of the complex by a high acidity of the reaction mixture, implying a high consumption of base and a high salt content in the mixture. Fourth, other disadvantages relating to these salts originate from their low stability and their presence in solution in the form of several species. These salts are, therefore, difficult to characterize and to determine. Also, their variable behavior with respect to complexing by phosphine provides an additional difficulty.

Additional problems inherent in these prior art catalysts are demonstrated from their performance in industrial processes. In particular, because of the high cost of rhodium, it is important to be able to recycle the catalyst and to limit the supplementary amounts of rhodium supplied in each cycle. It has not been possible to resolve this latter problem satisfactorily by means of the catalysts described in the prior art. Catalysts based on rhodium and phosphine are desired which address these inherent problems.

In accordance with the invention, catalysts based on rhodium and phosphine are obtained by using rhodium perchlorate as the precursor rhodium salt. It is also possible to obtain these catalysts on an industrial scale and in a reproducible manner These catalysts also exhibit superior catalytic performances.

In accordance with one embodiment of the invention, catalysts are provided which consist of a rhodium atom to which three water-soluble phosphines are bonded, and a counter-ion, the counter-ion being perchlorate.

The water-soluble phosphines which can be used within the framework of the present invention are those described in the above-mentioned French Patent 7,622,824, the disclosure of which is hereby specifically incorporated by reference.

More particularly, it is preferred to use at least one phosphine of formula (I):

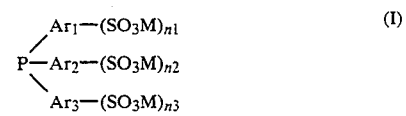

in which $Ar_1$, $Ar_2$ and $Ar_3$, which may be identical or different, each represent a radical chosen from the group comprising phenylene radicals and naphthylene radicals, these radicals being optionally substituted; M is a cationic radical of inorganic or organic origin, chosen such that the phosphine of formula (I) is soluble in water; and $n_1$, $n_2$ and $n_3$, which may be identical or different, are integers greater than or equal to 0 and less than or equal to 3, at least one being greater than or equal to 1.

The phenylene and napthylene radicals may be substituted by any radicals which do not impair the solubility of the phosphine of formula (I) in water. Amongst these substitutable radicals, the following may be mentioned by way of example: alkyl radicals having from 1 to 6 carbon atoms, alkoxy radicals having from 1 to 6 carbon atoms, halogen atoms and —OH, —CN, —NO_2, —N—(alkyl)_2, and carboxylate radicals.

Preferably, the catalysts according to the invention consist of a phosphine of formula (I) in which $Ar_1$, $Ar_2$ and $Ar_3$, which may be identical or different, each represent a radical chosen from the group comprising the phenylene radical and substituted phenylene radicals. Still more preferentially, a phosphine is used in which at least one of the $SO_3M$ groups is in the meta-position on the benzene ring.

M is preferably chosen from the group comprising the cations of the metals Na, K, Ca, and Ba, $NH_4^+$ ions and quaternary ammonium ions, such as tetramethylammonium, tetrapropylammonium and tetrabutylammonium ions.

The integers $n_1$, $n_2$ and $n_3$ are preferably 0 or 1, with $n_1+n_2+n_3$ being between 1 and 3 ($1 \leq n_1+n_2+n_3 \leq 3$).

The more particularly preferred phosphine compounds of formula (I) are meta-trisulphonated triphenylphosphine, meta-disulphonated triphenylphosphine and meta-monosulphonated triphenylphospine, the formulae of which are, respectively:

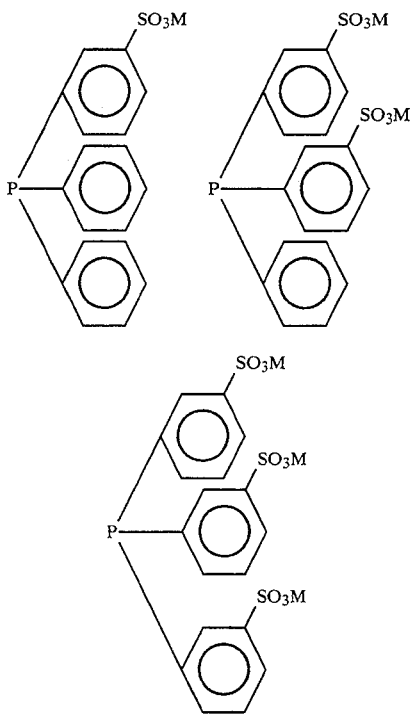

where M has the meaning set forth above.

The following compounds may be mentioned as further examples of phosphines of formula (I) which can be used in the preparation of the catalysts according to the invention: the alkali metal or alkaline earth metal salts, the ammonium salts and the quaternary ammonium salts of (p-sulphophenyl)diphenylphosphine; (m-sulpho, p-methylphenyl)di(p-methylphenyl)phosphine; (m-sulpho-p-methylphenyl)di(p-methoxyphenyl)phosphine; (m-sulpho, p-chlorophenyl)di(p-chlorophenyl)phosphine; di(p-sulphophenyl)phenylphosphine; di(m-sulpho, p-methyl-phenyl)(p-methylphenyl)phosphine; di(m-sulpho, p-methoxyphenyl)(p-methoxyphenyl)phosphine; di(m-sulpho,p-chlorophenyl)(p-chlorophenyl)phosphine; tri(p-sulphophenyl)phosphine; tri(m-sulpho, p-methylphenyl)phosphine; tri(p-sulphophenyl)phosphine; ri(m-sulpho, p-methylphenyl)phosphine; tri(m-sulpho, p-methoxyphenyl)phosphine; tri(m-sulpho, p-methoxy-phenyl)phosphine; tri(m-sulpho, p-chlorophenyl)-phosphine; (o-sulpho, p-methyl)(m,m'-disulpho, p-methyl)phosphine; and (m-sulphophenyl)(m-sulpho, p-chlorophenyl)(m,m'-disulpho, p-chlorophenyl)-phosphine.

In accordance with another embodiment of the invention, a process for the preparation of these catalysts is provided. It was known in the prior art to prepare rhodium perchlorate; in particular by direct action of perchloric acid on rhodium chloride (Ayres et al., J. Inorg. Nucl. Chem., 1957, Vol. 3, p. 365). It was also known to prepare rhodium perchlorate by keeping $Na_3RhCl_6$ at a boil for 30 minutes in perchloric acid (Jorgensen, Acta. Chem. Scand., 1956, 10, 500). Finally, Shukla studied the chemistry of rhodium perchlorate and analyzed the various synthesis reaction products (Annales de Chimie, 1961, 1383).

However, these Shukla analyses related only to micro amounts of the salt prepared under experimental laboratory conditions, which are not transferable to the industrial scale. The same applies to the processes described by Ayres and by Jorgensen, none of which, for safety reasons, could be exploited industrially. Finally, these documents do not suggest the possible use of rhodium salt complexed with a phosphine as a catalyst, nor in view of the small amounts which were prepared, would such industrial use have been possible.

Thus, a process for the preparation of these catalysts is provided. The steps constituting this process are: (a) in a first step, rhodium hydroxide is precipitated cold in the presence of a base; (b) in a second step, the precipitate thus obtained is dissolved in concentrated perchloric acid in order to form rhodium perchlorate; (c) in a third optional step, the rhodium perchlorate is crystallized, and (d) in a fourth step, the rhodium perchlorate obtained is refluxed in the presence of a water-soluble phosphine in order to form the catalyst.

In accordance with another aspect of the invention, the precipitation of the rhodium hydroxide is obtained using a strong base, such as, in particular, inorganic bases. The strong base is preferably sodium hydroxide, potassium hydroxide or ammonia. Sodium hydroxide in particular gives very good results.

This precipitation is preferably carried out at a temperature of below 25° C., such as, in particular, ambient temperature. The precipitate obtained may then be separated by centrifuging off and then washed with distilled water before being subjected to the following, dissolving step (b).

The dissolving step (b) consists of forming rhodium perchlorate by dissolving the precipitate obtained in concentrated perchloric acid. Advantageously, the perchloric acid concentration is chosen between 10 and 70% by weight in water, and preferably between 20 and 40%.

It may be preferable, before continuing with the process, to ensure that the solution thus obtained contains a single Rh species (1 single rapid band in electrophoresis). If this is not the case, the first two steps (a) and (b) may be repeated.

The third step (c), crystallization, is an optional step which enables the performance of the catalyst to be improved, the acidity of the mixture to be reduced and the determination of the salt to be facilitated. The crystallization is obtained by removing the water contained in the solution thus obtained, by subjecting said solution to a temperature of between 20° and 120° C., and preferably between 30° and 80° C., if appropriate under vacuum, followed by supplementary evaporation under vacuum of the resulting perchloric solution, at a temperature of between 20° and 170° C. and preferably between 70° and 130° C. During this step, concentrated perchloric acid may be used to carry out the appropriate rinsing. The quality of the crystals obtained may be checked by electrophoresis on cellulose, as indicated in the examples.

The final, refluxing step (d) of this process results in the catalysts of the invention, by reduction and complexing of the rhodium perchlorate with the water-soluble phosphine. More particularly, the catalyst is prepared by refluxing a mixture of rhodium perchlorate and water-soluble phosphine for a period of from 30 minutes to 10 hours, and preferably of from 1 to 4 hours.

In a preferred aspect of the invention, the amount of phosphine is chosen such that the number of gram atoms of trivalent phosphorus relative to one gram atom of rhodium is greater than or equal to 4, and preferably between 4 and 30.

For correct implementation of the invention, it may also be preferable to carry out this final step in a medium rendered inert, in order to restrict the parasitic oxidation of the phosphines. In particular, it is advantageous to work under a stream of an inert gas, such as argon, helium or nitrogen.

In accordance with another embodiment of the invention, the catalysts according to the invention may be used in various reactions, and in particular in reactions for the hydrogenation of dienes or for the addition of compounds containing active methylene groups to dienes.

For example, a particularly preferred use of these catalysts relates to the addition reaction of a compound containing an active methylene group, of formula X—CH$_2$—Y(III), with a substituted conjugated diene of formula CH$_2$=C(R)—CH=CH$_2$(II), in accordance with the following reaction scheme, described in the above-mentioned French Patent 8,015,355:

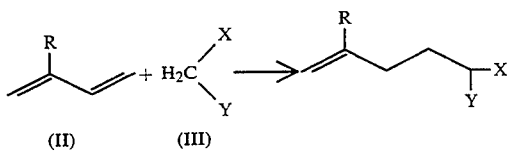

In formula (II), R represents a radical chosen from the group comprising alkyl radicals having from 1 to 20 carbon atoms approximately and phenyl and naphthyl radicals, which are optionally substituted by alkyl radicals having 1 to 20 carbon atoms.

In formula (III), X and Y, which may be identical or different, are electron-attracting groups chosen from the group comprising the radicals of formula —CHO, —COR$_1$, —CO$_2$R$_2$, —SO$_2$R$_3$, —CONR$_4$R$_5$, —CN, OR —NO$_2$, where R$_1$, R$_2$, R$_3$, R$_4$ and R$_5$ each represent a hydrocarbon radical containing from 1 to 12 carbon atoms.

The following may be mentioned as examples of compounds of formula (II): myrcene (R=C$_6$H$_{11}$), isoprene (R=CH$_3$) or (R=CH$_3$) or β-farnesene (R=C$_{11}$H$_{19}$), and as examples of compounds of formula (III): pentane-2,4-dione, ethyl acetylacetate, methyl acetylacetate or phenylsulphonylacetone.

The method can be used, for example, to prepare β-ketoesters.

A practical method for using the catalysts consists in charging either the pre-formed catalyst, which may be crystallized, or the various components (phosphine, rhodium perchlorate) into a suitable reactor, after having purged the latter using an inert gas. The reactor is brought to the reaction temperature (generally between 50° and 150° C.) before or after the introduction of the compound containing an active methylene group, which compound itself may be introduced before, after, or simultaneously with the substituted conjugated diene. After the reaction has ceased, the reaction mixture is cooled to ambient temperature. The contents of the reactor are withdrawn and the reaction product, which is in the organic phase, is then isolated by separating said organic phase, by means of phase separation and, if appropriate, by extraction using a suitable solvent, from the aqueous phase containing the catalyst. The aqueous solution recovered may be recycled into the reactor for a fresh reaction.

The following observations are made with the catalysts of the invention: (a) relatively rapid reaction kinetics and a high selectivity of the reaction, and (b) a relative reduction of 15 to 20% in the amounts of rhodium added in each cycle in the case of repeated recycling of the catalytic phase.

To illustrate the nature of the invention, the following examples are given. It should be understood, however, that the invention is not to be limited to the specific conditions or details set forth in these examples.

EXAMPLE 1

Synthesis of Rhodium Perchlorate

The starting materials were aqueous rhodium sulphate (Rh$_2$(SO$_4$)$_3$) solution with a rhodium content of 8.23 to 8.5% and a H$_2$SO$_4$ content of 0.21 to 0.87 mol/kg; a min. 30% sodium hydroxide solution; a normal sodium hydroxide solution; demineralized water, and 40% perchloric acid solution.

Twenty-four grams (calculated as metal) of the rhodium sulphate solution were used. The acidity of the solution was tested and an amount of 30% sodium hydroxide solution sufficient to adjust the pH to 7 was added, with stirring. The pH was then brought to 9 using normal sodium hydroxide solution. The precipitate obtained was separated off by centrifuging again, then washed with distilled water. After centrifuging again, the washing step was repeated. The precipitate thus obtained was then dissolved in 40% perchloric acid (q.s. a final free acidity of the order 1 mol/kg).

At this stage, the efficacy of the reaction was checked by electrophoresis. (If several bands appear, these two steps are repeated. The rhodium perchlorate may be used as such to prepare the catalyst or may be crystalized beforehand.)

In this case, the precipitate was dissolved again by adding the stoichiometric amount of perchloric acid and the mother liquors from the preceding crystallization.

The water in the solution was then evaporated at 80° C. under 0.1-0.01 mmHg in order to obtain a crystal slurry. The mixture was then allowed to return to ambient temperature and to crystallize overnight. The suspension obtained was placed in the refrigerator and then in a freezer and finally was filtered on a No. 4 frit under ejecting vacuum and under a stream of nitrogen. The filter cake was then rinsed with 70% perchloric acid and the crystals were dried by evaporating off the perchloric acid which they contain, under vacuum at 80° C.

This process enabled us to obtain 95.2 g of pure perchlorate, corresponding to 19.24 g of rhodium.

The quality of the crystals was checked by paper electrophoresis. To this end, the developer used was advantageously a buffered solution of javel water and the electrolyte used was preferentially a 0.1N perchloric acid solution. A strip of Whatman paper was impregnated with 20 ml of electrolyte and then dried between two sheets of blotting paper. 0.1 to 0.8 mg of Rh was then deposited over the width of the strip and the strip was introduced into the electrophoresis cell. After applying voltage (300 V, 30 min), the developer was sprayed and the various species of Rh appeared in blue.

The crystals obtained were stored under nitrogen.

EXAMPLE 2

Synthesis of the Catalyst

The starting materials were rhodium perchlorate crystals obtained in Example 1 and aqueous phosphine solution (from Ruhrchemie).

The catalyst was prepared directly from the salt, without increasing the acidity, the degree of complexing being quantitative.

Example 2.1

250 g of a 0.535 mol/kg solution of TSTPP (meta-trisulphonated triphenylphosphine) having a solids content of 33%, which is $133.75 \times 10^{-3}$ mol of TSTPP, were introduced into a 0.5 liter glass reactor fitted with a stirrer and thermometer and previously purged with nitrogen.

The solution was stirred. The reactor was then heated under reflux at 100° C. for one hour, while distilling off water and degassing with nitrogen. 9.734 g of pure rhodium perchlorate crystals, which was $19.11 \times 10^{-3}$ gram atoms of Rh, were then added, while continuing to stir. The mixture was refluxed at 100° C. for 6 hours, while distilling off water and degassing with nitrogen. The reactor was then purged and rinsed with an amount of distilled water which allows the desired Rh content to be obtained. The catalyst obtained was stored in this state under nitrogen. The reaction yield was 100%.

Example 2.2

The procedure in Example 2.1 was followed, but this time $401.25 \times 10^{-3}$ mol of TSTPP was introduced for the same number of gram atoms of rhodium. The P/Rh ratio was 21. The catalyst yield was 100%.

Example 2.3

The procedure in Example 2.1 was followed, but DSTPP (meta-disulphonated triphenylphosphine) was used. The P/Rh ratio was 7. The catalyst yield was 100%.

EXAMPLE 3

This comparative example demonstrates the advantages of rhodium perchlorate compared with other precursor salts. In each case (sulphate, trichloride, nitrate, acetate, perchlorate), the operating method followed was identical to that described in Example 2. The phosphine used was TSTPP. The yields of rhodium in the form of the complex and in the form of the active species are given in the following table.

| SALT | P/Rh | % Rh in the form of the complex | % AS |
|---|---|---|---|
| Rh Sulphate | 7 | 80-90 | 100 |
|  | 21 | 80-90 | 100 |
| Rh Trichloride | 5 (C) | 0 | — |
|  | 21 (C) | 94 | 100 |
| Rh Nitrate | 7 | 0 | — |
| Rh Acetate | 5 (C) | 100 | 38 |
|  | 5 (C) | 100 | 54 |
|  | 21 (C) | 100 | 30 |
| Rh Perchlorate | 7 (NC) | 100 | 100 |
|  | 7 (C) | 100 | 100 |
|  | 21 | 100 | 100 |

C = Crystalline
NC = Non-crystalline
% AS, % in the form of the active species = ratio of moles of active species per mol of Rh in the form of the complex

EXAMPLE 4

The influence of the acidity of the rhodium salt solution on the phosphine oxidation parasitic reactions was studied. These experiments were carried out under the following conditions: (a) within the framework of a reaction for the preparation of the catalyst, for 6 hours under reflux using a P/Rh ratio of 7, and (b) after storing the catalytic solution for 6 days at 80° C., by simulating the free acidity using sulphuric acid (in the case of rhodium sulphate) or perchloric acid (in the case of rhodium perchlorate). The results are collated in the table below.

| Free acidity $[H^+]$ | % OP (a) | % OP (b) |
|---|---|---|
| 0 | 10 | nd |
| 0.4 | 25 | 59.7 |
| 1.3 | 30.3 | 69.7 |
| 3 | 35.7 | 100 |
| 5 | nd | nd |

% OP = % of oxidized phosphine
nd = not determined

In the case of rhodium nitrate and rhodium chloride, the oxidation kinetics are even more rapid, it being possible for all of the phosphine to be oxidized within 6 hours.

With regard to both preparation and storage, these results indicated that rhodium salt solutions of low acidity should be used. Taking account of the total lack of free acidity obtained with rhodium perchlorate, preferably in crystalline form, these results demonstrate the advantages of this salt compared with those previously described.

EXAMPLE 5

This example illustrates the use of catalysts according to the invention for catalyzing the addition reaction of a compound containing an active methylene group with a substituted conjugated diene.

Example 5.1

Description of an Isolated Reaction

This example shows the efficacy of the catalysts in an addition reaction of methyl acetylacetate with myrcene.

296.05 g of aqueous catalyst solution, equivalent to $3.448 \times 10^{-3}$ mol of rhodium, was introduced into a 1 liter glass reactor fitted with a central stirrer, a thermometer and a condenser and previously purged with nitrogen. 178.09 g of 76.5% myrcene, 151.70 g of 99.5% methyl acetylacetate and 83.8 g of methanol were then added, with stirring. The mixture was heated at 90° C. for 165 minutes and the temperature was then lowered to 75° C. before stopping stirring in order to permit phase separation. The mixture was then cooled down to ambient temperature and the aqueous and organic phases were separated at 20° C.

After analysis of the organic phase, the yield was determined: the degree of conversion of myrcene was: >99%; the yield of β-ketoester was >99%; and selectivity was 99%.

Example 5.2

Use in a Process with Recycling

This example illustrates the advantages of the catalysts of the invention over those of the prior art when they are used in processes with recycling. More specifically, this example shows the reduction in the supplementary amounts of rhodium supplied during each cycle of the reaction when the catalysts of the invention are used.

At the end of the reaction described in Example 5.1, the residual aqueous phase containing the catalyst was recycled into the reactor to catalyze a fresh reaction. This recycling was repeated at the end of each reaction, it being necessary to supply an additional amount of catalyst in each cycle. The results shown in the following table show that, for a higher steady degree of conversion of the myrcene, the supplementary amounts of catalyst of the invention (and thus of rhodium) were lower by about 10%.

| Rhodium Salt | Steady DC | Amounts supplied (g of Rh) |
| --- | --- | --- |
| Sulphate | 96% | 60 |
| Perchlorate | 98% | 50 |

What is claimed is:

1. A method comprising catalyzing the addition reaction of compounds containing active methylene groups with dienes with a catalyst comprising a rhodium atom to which three water-soluble phosphines are bonded, and a perchlorate counter-ion.

2. The method of claim 1, wherein the catalyst is used to catalyze the addition reaction of a compound containing an active methylene group of formula $X-CH_2-Y$ (III) with a substituted conjugated diene of formula $CH_2=C(R)-CH=CH_2$ (II), in which R represents a radical selected from the group consisting of alkyl radicals having from 1 to 20 carbon atoms approximately and phenyl and naphthyl radicals, which may be substituted by alkyl radicals having from 1 to 20 carbon atoms, and X and Y, which may be identical or different, are electron-attracting groups selected from the group consisting of the radicals of formula $-CHO$, $-COR_1$, $-CO_2R_2$, $-SO_2R_3$, $-CONR_4R_5$, $-CN$, and $-NO_2$, where $R_1$, $R_2$, $R_3$, $R_4$ and $R_5$ each represent a hydrocarbon radical containing from 1 to 12 carbon atoms.

3. The method of claim 2, wherein the compounds of formula (II) are selected from the group consisting of myrcene ($R=C_6H_{11}$), isoprene ($R=CH_3$) and $\beta$-farnesene ($R=C_{11}H_{19}$).

4. The method of claim 2, wherein the compounds of formula (III) are selected from the group consisting of pentane-2,4-dione, ethyl acetylacetate, methyl acetylacetate and phenylsulphonylacetone.

5. The method of claim 1, wherein said method is used to prepare $\beta$-ketoesters.

* * * * *